United States Patent [19]
Chen

[11] Patent Number: 5,636,537
[45] Date of Patent: Jun. 10, 1997

[54] AUTOMOBILE STEERING LOCK

[76] Inventor: Tian-Yuan Chen, No. 95-4, Min-Hsiang Road, Chung-Ho, Taipei Hsien, Taiwan

[21] Appl. No.: 445,715

[22] Filed: May 22, 1995

[51] Int. Cl.⁶ .................................................. B60R 25/10
[52] U.S. Cl. .......................... 70/209; 340/426; 307/10.2; 70/226; 70/DIG. 49; 292/144
[58] Field of Search .................... 70/209, 211, 212, 70/225, 226, 237, 238, DIG. 49, 277, 278; 292/144; 307/10.2, 10.1; 340/426; 180/287

[56] References Cited

U.S. PATENT DOCUMENTS

| | | | |
|---|---|---|---|
| 3,940,958 | 3/1976 | Kuroki | 70/252 |
| 4,917,419 | 4/1990 | Mora, Jr. et al. | 292/144 |
| 5,095,723 | 3/1992 | Lin | 70/209 |
| 5,128,649 | 7/1992 | Elmer | 70/226 |
| 5,181,403 | 1/1993 | Lii | 70/233 |
| 5,291,761 | 3/1994 | Lii | 70/233 |
| 5,347,836 | 9/1994 | Chen | 70/209 |
| 5,353,615 | 10/1994 | Chen | 70/209 |
| 5,375,441 | 12/1994 | Liou | 70/226 |
| 5,412,963 | 5/1995 | Carlo et al. | 70/257 |
| 5,428,976 | 7/1995 | Weng et al. | 70/209 |
| 5,452,597 | 9/1995 | Chen | 70/226 |
| 5,457,972 | 10/1995 | Lo | 70/226 |
| 5,469,135 | 11/1995 | Solow | 70/209 |

*Primary Examiner*—Darnell M. Boucher

[57] ABSTRACT

The steering wheel of an automobile is locked against unauthorized use by a pair of half housings that are secured together by a deadbolt which may be actuated by a remotely controlled electronic alarm and motor.

2 Claims, 5 Drawing Sheets

AUTOMOBILE STEERING LOCK

BACKGROUND OF THE INVENTION

This invention concerns an anti-theft lock for attachment to a steering wheel of an automobile, particularly one using a remote controller of an electronic alarm set for locking and unlocking this lock, without using a key.

Nowadays many kinds of anti-theft locks are used in automobiles, but they are generally unlocked by a key, therefore, they are liable to be pried open by smart thieves.

SUMMARY OF THE INVENTION

A main object of this invention is to offer a kind of automobile mobile steering lock using a remote controller instead of a key in locking and unlocking the lock.

A main feature of the present invention is a motor disposed in an inner half housing, the motor having a semiround activating block fixed at top of a shaft, and a block is fitted in a flat recess of a deadbolt, with the motor being connected to an electronic alarm set so that the motor can be turned on or off by a remote controller of the electronic alarm set to rotate the activating block 180 degrees to push up or pull down the deadbolt for locking or unlocking this lock.

DETAILED DESCRIPTION OF THE INVENTION

Figure 1:
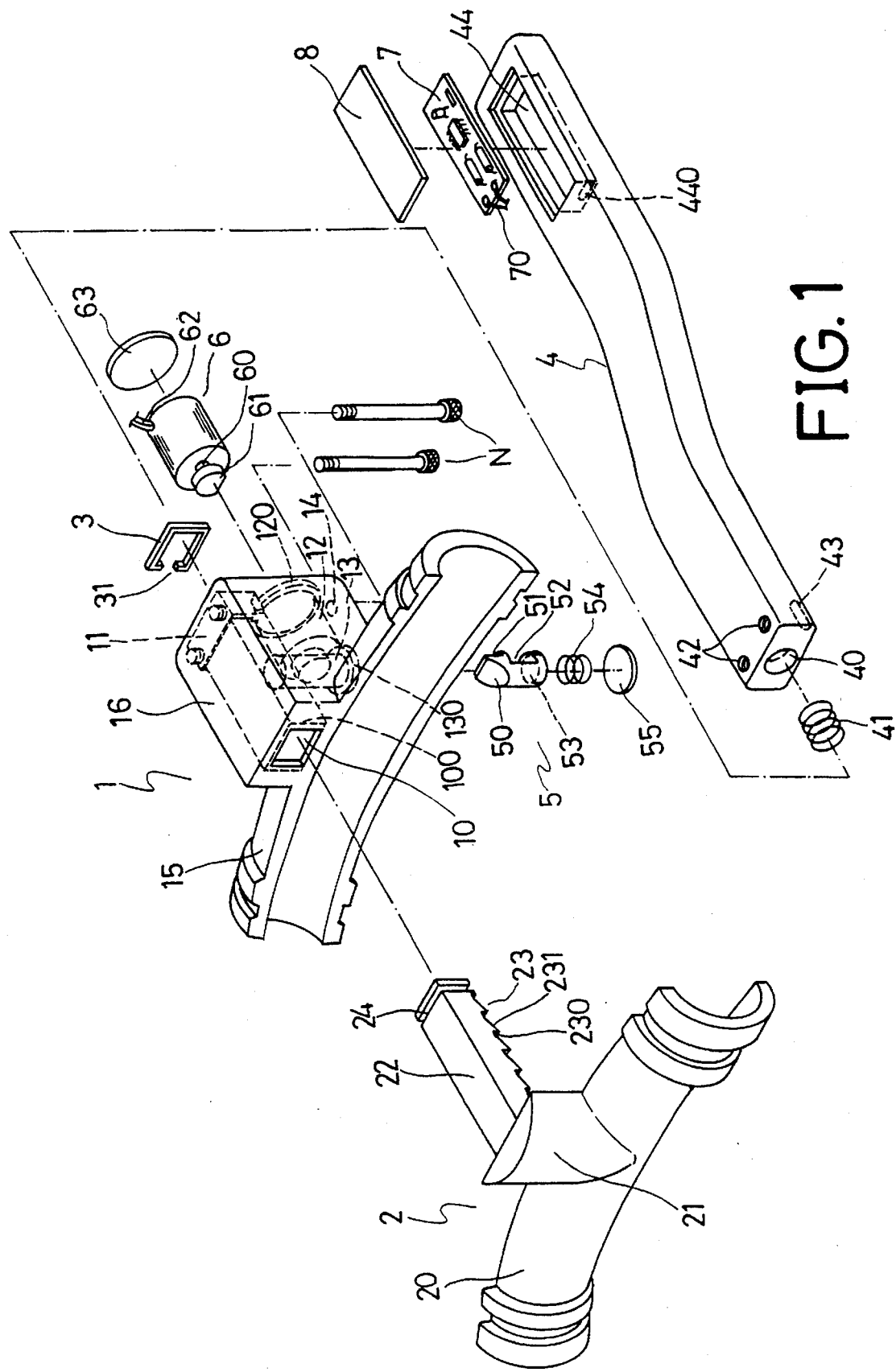
FIG. 1 is an exploded perspective view of an automobile steering lock in the present invention.

An automobile steering lock in the present invention, as shown in FIG. 1, comprises an inner half housing 1, an outer half housing 2, a stop member 3, an elongate rod 4, a head bolt 5, a motor 6, an electronic alarm set 7 and a cap 8 as main components combined together.

The inner half housing 1 has a block portion 16, a length-wise passageway 10 in an upper section of the block portion 16, a stop edge 100 of a small size, a chamber 11 formed in a rear end of the passageway 10, a motor hole 12 in parallel to the passageway 10 in the lower section of the block portion 16, a cover annular edge formed in an outer end of the motor hole 12 for a cover 63 to fit therein, a vertical deadbolt hole 13 provided in the lower section and communicating with the passageway 10 and the motor hole 12, an outer annular edge 130 in the deadbolt hole 13 for a cover 55 to fit therein, two vertical bolt holes 14, 14 are provided in the bottom of a rear end of the block portion 16 for a pair of bolts, to fit upwardly therethrough, and a curved semiround portion 15 formed to abut at a right angle on the block portion 16 and able to fit around an outer surface of a portion of the steering wheel of an automobile.

The outer half housing 2 has a curved semiround portion 20, a vertical wall 21 extending up from a center section of the semi-round portion 20, a locking rod 22 extending horizontally inward from an upper end of the vertical wall 21 and having a plurality of straight transverse grooves 23 in a bottom surface, an annular groove 24 in the end of the locking rod 22, and each of the grooves 23 having a sloped face 231 and a vertical face 230 adjacent each other. The curved semiround portion 15 and 20 fit around outer and inner surfaces of a portion of the steering wheel of an automobile so that the two half housings 1 and 2 may surround the portion of the steering wheel in locking engagement therewith.

The stop member 3 is shaped as a rectangular ring, having an aperture 31 in one side and a large center hole for engaging annular groove 24.

The elongate rod 4 has two bolt holes 42, 42 in the front end for the bolts 14, 14 to fit upwardly therethrough so as to fit through the bolt holes 14, 14 in the inner half housing 1 to combine the rod 4 with the half semiround housing 1, a recess 40 in a front end face for disposing a spring 41 therein, a cord hole 43 in the front bottom, a chamber 44 with an upper opening in a rear portion, and a cord hole 440 in a front wall of the chamber 44.

The deadbolt 5 is to be disposed in the vertical deadbolt hole 13 of the block portion 16 of the inner half housing 1, and has a sloped face 50 and a vertical face 51 at its upper end formed to selectively engage any of grooves 23, a flat recess 52 cut in an intermediate portion, a spring recess 53 in a bottom to receive a spring 54 therein, and a cover 55 fitting and welded in the opening edge 130 of the deadbolt hole 13 to stop and bias the spring 54.

The motor 6 is disposed in the motor hole 12 of the inner half housing 1, and has a shaft 60 extending to the front, a semi-round activating block 61 fixed at the front of the shaft 60, a power cord 62 coming out of the end of the motor 6, and a cover 63 fitting and welded in the opening edge 120 of the motor hole 12 of the inner half housing 1.

The electronic alarm set 7 is disposed in the chamber 44 of the elongate rod 4, and has a power cord 70 connected with the power cord 62 of the motor 6 for giving out high decibel sounds in case the steering wheel is rotated or the body of the automobile is touched by a would-be thief after this lock is installed. The alarm set 7 is controlled by a remote controller.

The cap 8 is provided to close the upper opening of the chamber 44 to protect the electronic alarm set 7 after the set 7 is disposed therein.

Figure 2:
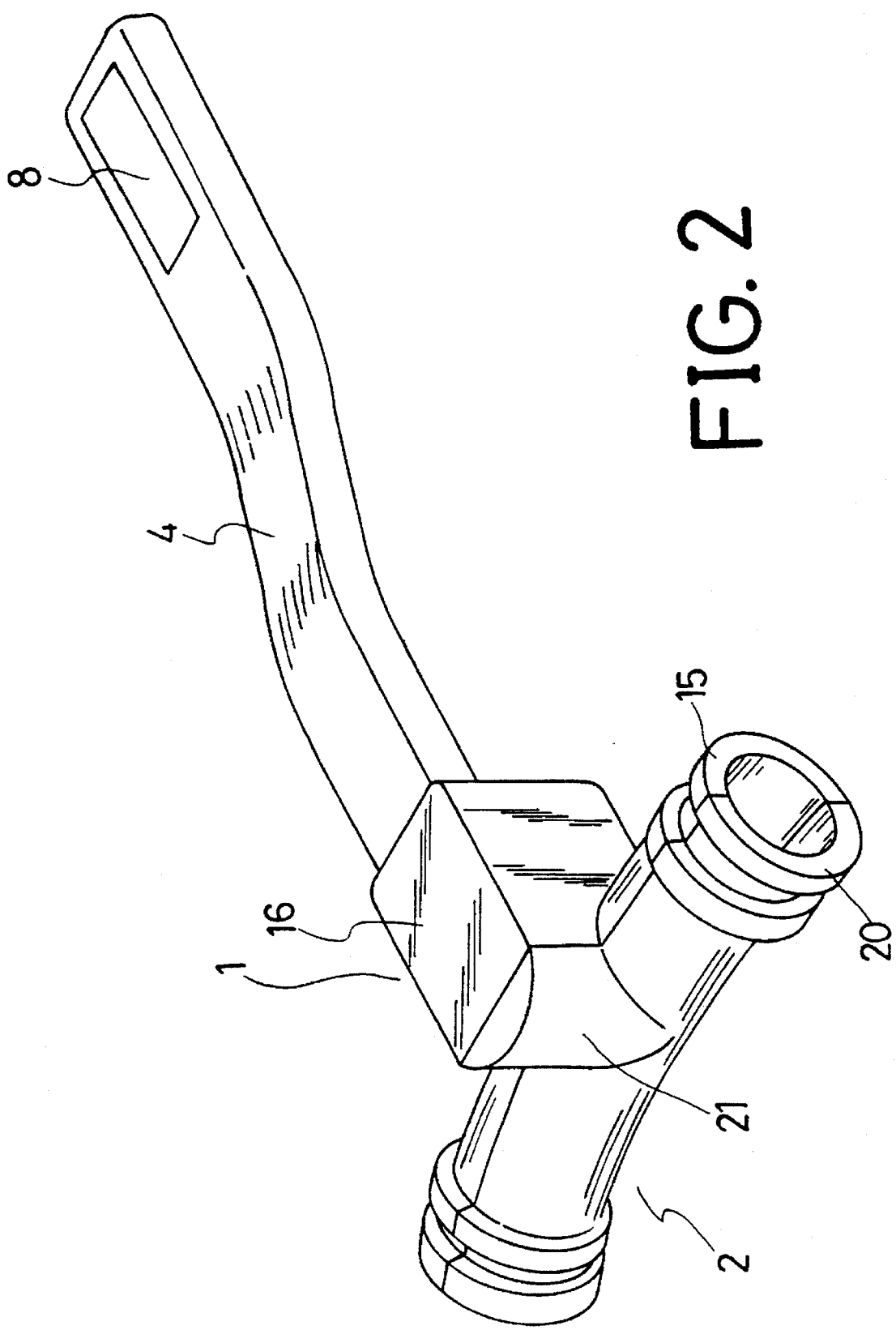
FIG. 2 is a perspective view of the automobile steering lock in the present invention.

In assembling, referring to FIGS. 1 and 2, firstly, the locking rod portion 22 of the outer half housing 2 is fitted the passageway 10 of the inner half housing 1, with the stop member 3 engaged in the annular groove 24 of the locking rod 22 to secure it in position and preventing it from completely separating from the block portion 16. Then the deadbolt 5 is inserted in the deadbolt hole 13 of the inner half housing 1, with the vertical face 51 engaging the vertical face 230 of one of the grooves 23 of the locking rod 22, the spring 53 is disposed in the recess 52, and with the cover 55 is fitted in the opening edge 130 of the deadbolt hole 13 and welded thereon. Next, the electronic alarm set 7 is disposed in the chamber 44 of the elongate rod 4, with its power cord 70 extending out of the hole 440 of the chamber 44 and out of the cord hole 43 in the front bottom of the elongate rod 4 and connected with the power cord 60 of the motor 6. After that, the cover 8 is used to close up the chamber 44, the spring 41 is disposed in the recess 40, and the front end of the elongate rod 4 is inserted in the chamber 11 of the inner half housing 1. The two bolts 14, 14 are threadedly engaged through the bolt holes 42, 42 and 14, 14, thus finishing the assemblage.

Figure 3:
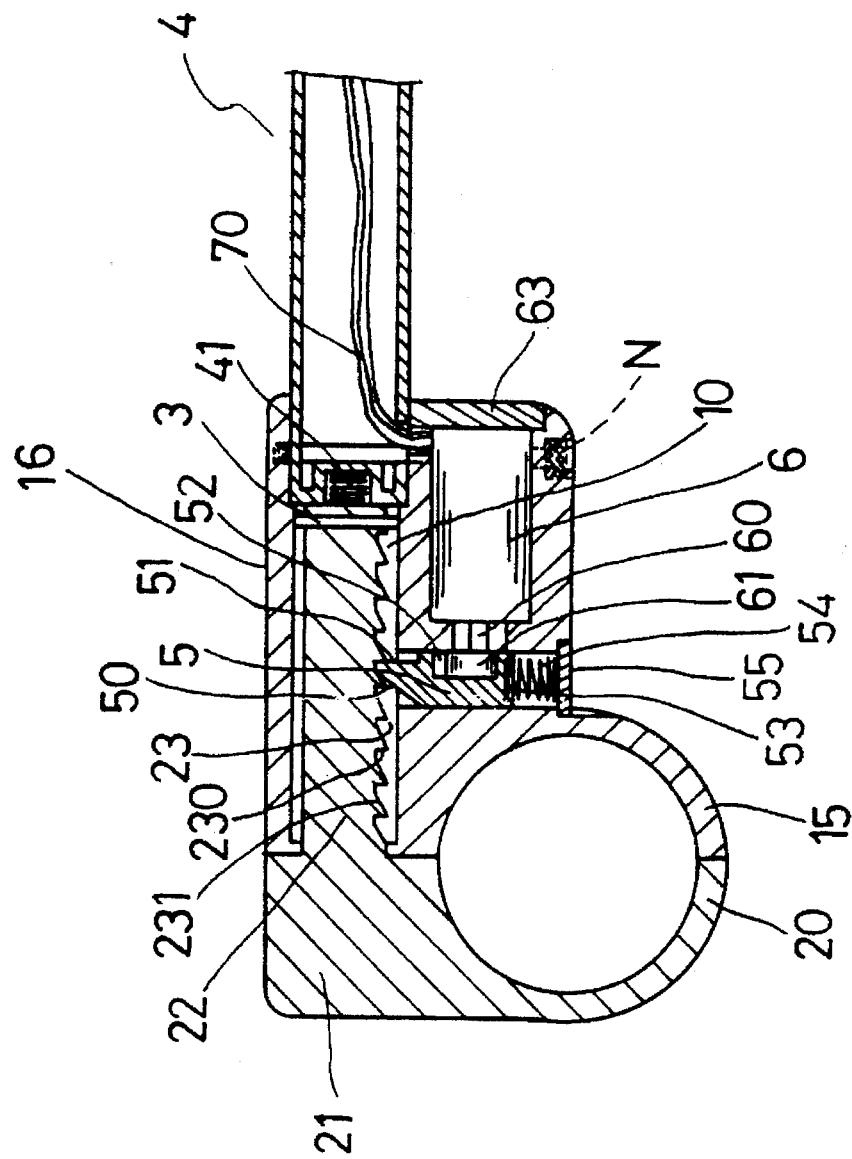
FIG. 3 is a cross-sectional view of the automobile steering lock in the present invention, showing it in a closed or locked condition.
Figure 4:
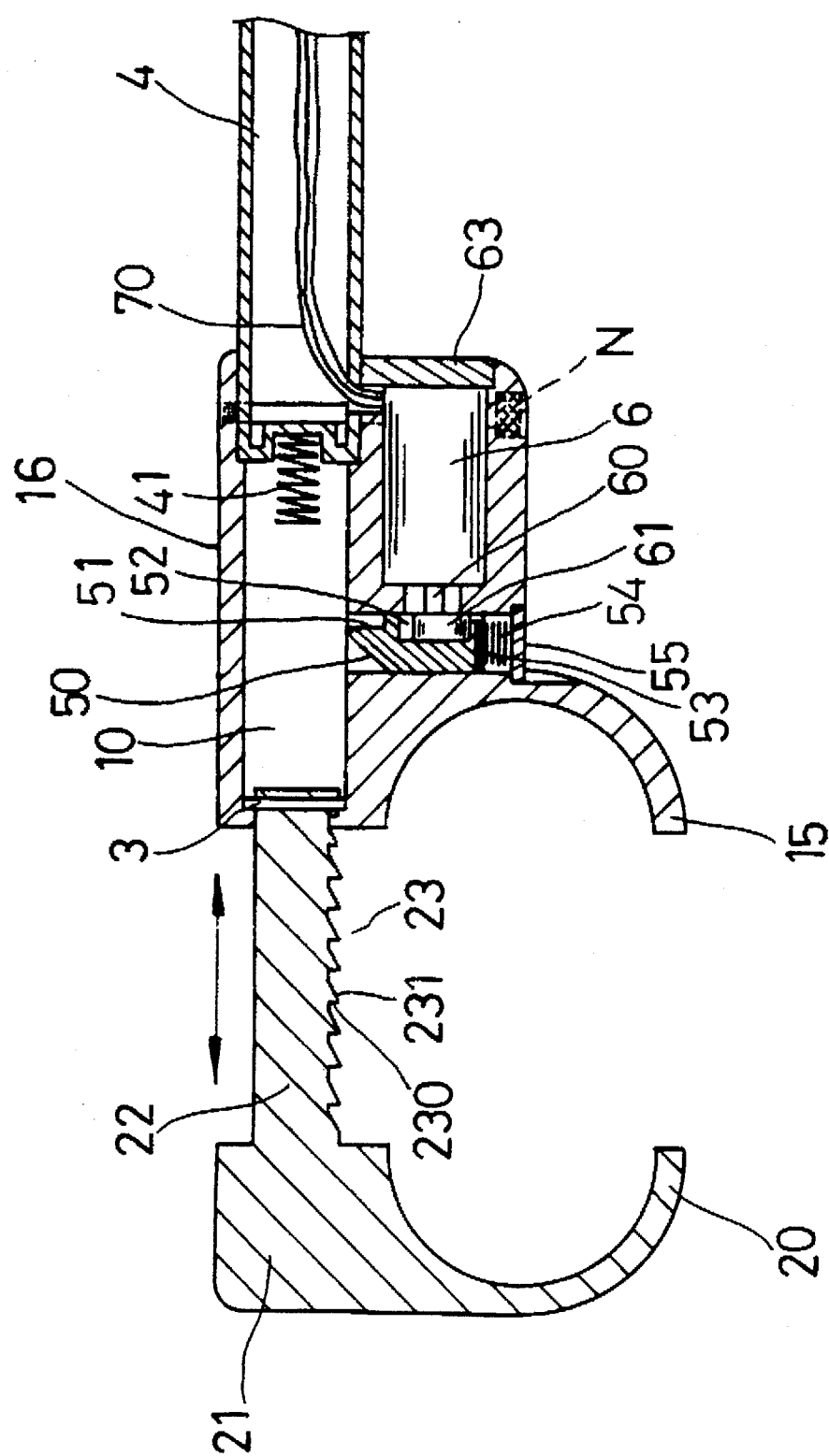
FIG. 4 is a cross-sectional view of the automobile steering lock in the present invention, showing it in an open or unlocked condition.
Figure 5:
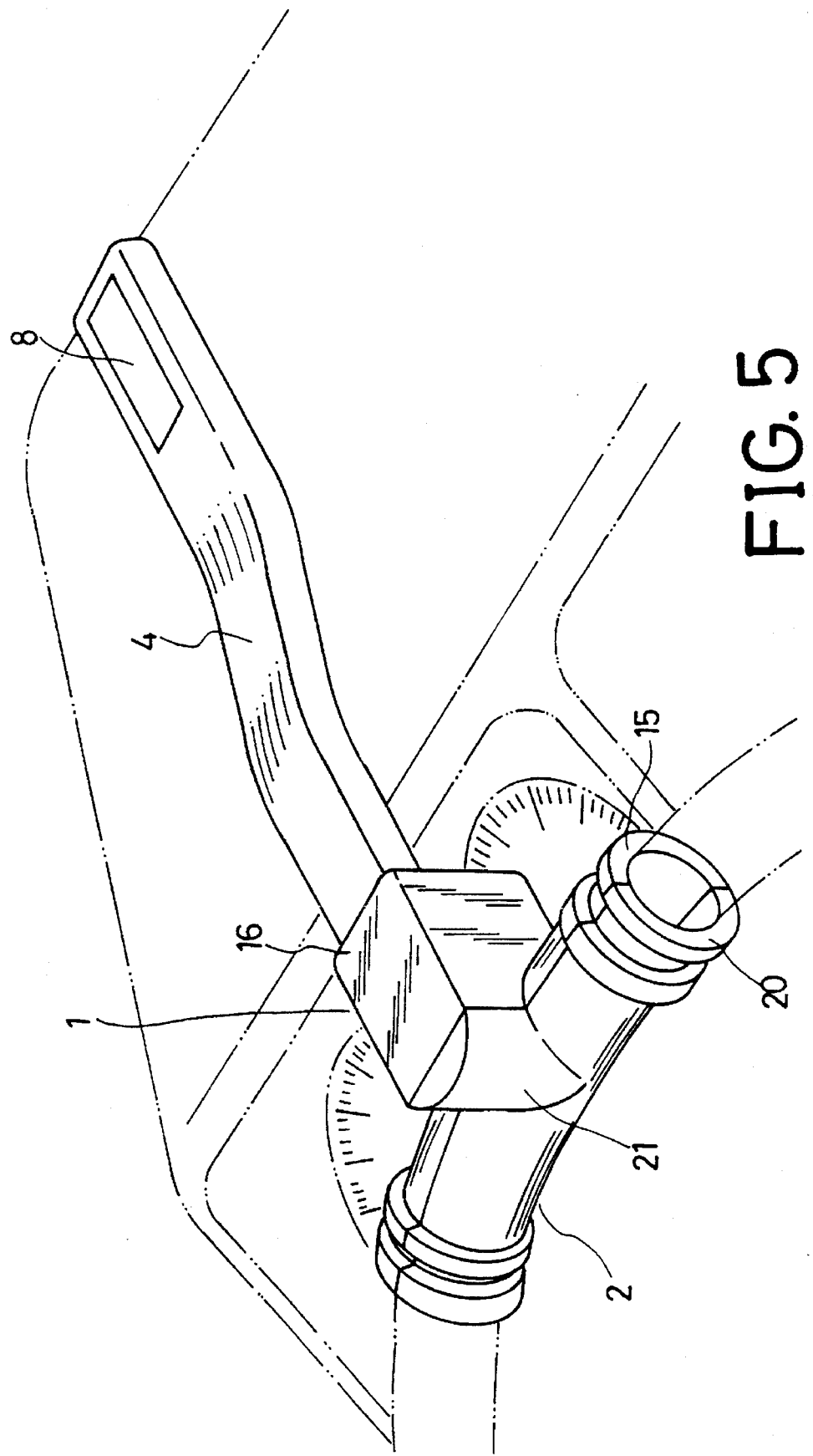
FIG. 5 is a perspective view of the automobile steering lock in the present invention, showing it applied on the steering wheel of an automobile.

If this lock is to be applied on the steering wheel of an automobile, referring to FIGS. 3, 4 and 5, firstly, the semiround portion 15 of the inner half housing 1 is fitted around the outer surface of an upper portion of the steering wheel, letting the elongate rod 4 extend to the corner between the gauge panel and the wind shield of the automobile, with the spring 54 pushing the deadbolt 5 upward to always engage one of the grooves 23 of the locking rod 22 of the outer half housing 2 in case of the deadbolt 5 being disposed in a locked condition. When the vertical face 51 of the deadbolt 5 engages a vertical face 230 of one of the grooves 23, the outer half housing 2 cannot be pulled outward but can be pulled inward because the sloped face 50 of the deadbolt 5 permits it to slide along the sloped face 231 of grooves owing to resilience of the spring 54, thus permitting the semiround portion 20 of the outer half housing 2 to closely surround the steering wheel, and the end of the locking rod 22 pressing the spring 41, with the elongate rod 4 having its end sticking to the corner of the gauge panel and the windshield, thus preventing the steering wheel from being rotated. In addition, a remote controller is operated to turn on the electronic alarm set 7, which is ready to give out a high decibel alarm if the lock being moved by rotating the steering wheel or by contacting the body of the automobile.

If this steering lock is to be disengaged from the steering wheel, referring to FIGS. 3 and 4, the remote controller is operated to cut off the electronic alarm set 7, and the motor 6 is started through the power cord 70, rotating the shaft 60 and the semiround block 61 for 180° degrees to push down the deadbolt 5 so that the vertical face 51 may separate from the vertical face 230 of the groove 23, letting the spring 41 resiliently push the locking rod 22 outward for such a distance as to enable the outer half housing 2 to be released from the steering wheel. Then the stop member 3 will prevent the locking rod 2 from being completely pulled out of the block portion 16 of the inner half portion.

As can be understood from the above description, this automobile steering lock has the following advantages.

1. Locking and unlocking this lock is operated by means of the remote controller, this is very convenient and handy.
2. The deadbolt moves steadily in engagement and disengagement from any one of the grooves of the locking rod, thus assuring that the locking or unlocking action is stable and accurate.
3. The remote controller makes the locking or unlocking action accurate and convenient, thus preventing the automobile from being stolen, and also providing an alarm.

What is claimed is:

1. An anti-theft lock for attachment to a steering wheel of an automobile, comprising:

an inner half housing having a block portion and a curved semiround portion formed at a front of said block portion, said block portion having a lengthwise passageway in an upper section, a chamber behind the passageway in a rear end, a motor hole in parallel to the passageway in a lower section, the motor hole having an opening in a rear end, a deadbolt hole extending vertically upward in a bottom surface and communicating with the passageway and the motor hole, two vertically extending bolt holes provided in a rear end, the deadbolt hole having an opening edge of a larger diameter than itself;

an outer half housing having a curved semiround portion and a vertical wall extending up from a center portion of the semiround portion, a lateral horizontal locking rod extending from an upper end of the vertical wall and having a plurality of straight transverse grooves on a bottom surface;

an elongate rod having its front end combined with the rear end of the block portion of said inner half housing by means of two bolts, a recess in a front end surface, a spring disposed in the recess, a cord hole in a front end bottom, a chamber with an upper opening in a rear portion, and a cord hole in a front wall of the chamber;

an electronic alarm set disposed in the chamber of said elongate rod, and a cap provided to close up the upper opening of the chamber to protect the electronic alarm set;

a deadbolt disposed in the deadbolt hole in the block portion of said inner half housing, the deadbolt having a sloped face and a vertical face for selectively engaging any of the transverse grooves, a flat recess in an intermediate portion, and a spring recess in a bottom end;

a spring disposed in the spring recess of said deadbolt;

a cover welded to close up the deadbolt hole and biasing the spring disposed therein;

a motor disposed in the motor hole of the block portion of said inner half housing; said motor having a shaft extending inward and fixed with a semi-round activating block at an end of the shaft wherein the activating block is fitted into the flat recess of said deadbolt; and wherein a power cord is disposed through the cord hole in the front wall of the chamber and connected with said electronic alarm set, the inner half housing and said outer half housing are fitted around a portion of a steering wheel of an automobile and locked by said deadbolt engaging one of the grooves of the locking rod of the outer half housing, and a remote controller of said electronic alarm set is adapted to activate the electronic alarm set for giving out a high decibel sound in case of attempted theft of the automobile or rotation of the steering wheel.

2. The anti-theft lock for attachment to a steering wheel of an automobile as claimed in claim 1, wherein said locking rod of said outer half housing has an annular groove in a rear end, and a stop ring engaged within the annular groove to prevent said locking rod from separating completely from the block portion of said inner half housing.

* * * * *